United States Patent [19]

Lassy

[11] 3,738,638

[45] June 12, 1973

[54] WORKPIECE SUPPORTING CLIP ON PARALLELS AND ROLLER BEARING TYPE HOLD-DOWN JAWS

[76] Inventor: Carl O. Lassy, c/o Lassy Tool Company, Bristol, Conn. 06062

[22] Filed: May 22, 1970

[21] Appl. No.: 39,652

Related U.S. Application Data

[62] Division of Ser. No. 589,269, Oct. 25, 1966, Pat. No. 3,514,092.

[52] U.S. Cl. ............................. 269/136, 269/138
[51] Int. Cl. ........................................ B23q 3/02
[58] Field of Search .................. 269/134–138, 285

[56] References Cited
UNITED STATES PATENTS

| | | | |
|---|---|---|---|
| 3,514,092 | 5/1970 | Lassy | 269/134 |
| 3,397,880 | 8/1968 | Kuban | 269/134 X |
| 2,247,656 | 7/1941 | Friedrich | 269/134 |

FOREIGN PATENTS OR APPLICATIONS

| | | | |
|---|---|---|---|
| 390,677 | 5/1943 | Canada | 269/134 |
| 21,470 | 2/1905 | Great Britain | 269/134 |

Primary Examiner—Granville Y. Custer, Jr.
Attorney—Clarence A. O'Brien and Harvey B. Jacobson

[57] ABSTRACT

A workpiece holder including a bed and a pair of upstanding opposed jaws mounted thereon with at least one jaw being movable in relation to the other. Clip-on parallels are provided for positioning between the bed and a workpiece and attached to the jaw so that it will not be displaced when the workpiece is inserted into or taken out of the holder. At least one jaw is provided with means exerting a downward force on the workpiece when the jaws are moved toward each other into clamping engagement with the workpiece with such means being in the form of a roller bearing attachment having inclined surfaces engaging the roller bearing.

11 Claims, 5 Drawing Figures

Carl O. Lassy
INVENTOR.

Carl O. Lassy
INVENTOR.

BY Clarence A. O'Brien
and Harvey B. Jacobson
Attorneys

WORKPIECE SUPPORTING CLIP ON PARALLELS AND ROLLER BEARING TYPE HOLD-DOWN JAWS

This application is a division of Ser. No. 589,269, filed Oct. 25, 1966 now U.S. Pat. No. 3,514,092 issued May 26, 1970, for WORKPIECE HOLD-DOWN JAWS.

The present invention generally relates to clamping jaws for a workpiece which may be employed in conjunction with vises or other apparatuses used in holding workpieces when some machining or other work operation is performed on the workpiece.

An object of the present invention is to provide a workpiece holder employing parallels engaging the bed of a vise structure and supporting a workpiece thereon with the parallels being connected with the jaws of the vise by spring clips to retain the parallels properly positioned against the vise bed to preclude the possibility of chips and the like from getting under the parallels and between the bottom of the parallels and the bed of the vise.

Another object of the invention is to provide a workpiece holder in the form of a vise in which the jaws include a plurality of roller bearings oriented in engagement with inclined surfaces so that clamping pressure exerted by the jaws will introduce a vertical component of movement and force on the gripping jaws thus biasing the workpiece downwardly.

A further object of the present invention is to provide a workpiece holder in the form of a vise which includes features which will automatically exert a downward force on the workpiece when the clamp jaws of the vise are tightened and which includes parallels supporting a workpiece from the bed of the vise in which such structure is relatively simple but yet versatile, long lasting and dependable.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
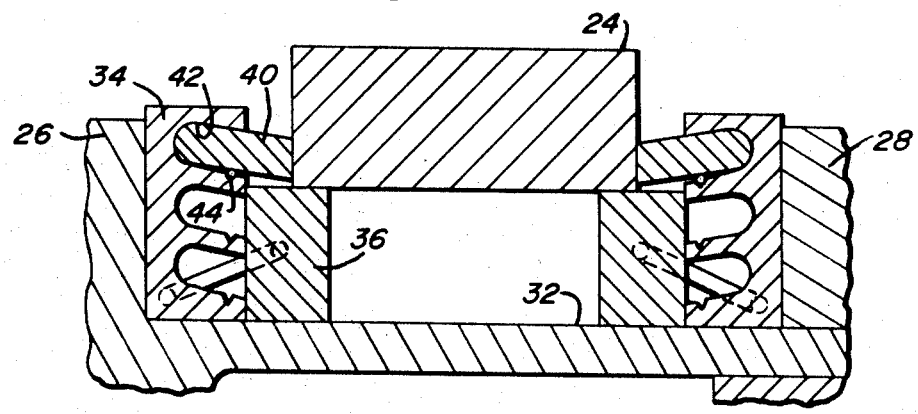
FIG. 1 is a sectional view of the arrangement in which parallels support the workpiece with holddown pawls retaining the workpiece against the parallels and the parallels being retained in position by spring clips engaging the gripping jaw.

Referring now specifically to the drawings, the workpiece holddown jaws are used with a vise for holding a workpiece 24. The vise may be of any suitable construction and includes relatively movable jaws 26 and 28 with the jaw 26 usually being stationary and the jaw 28 being movable in relation thereto. The vise also includes a precision surface such as the base surface or bed 32 on which the workpiece conventionally rests and which forms a precision reference surface for accurately retaining the workpiece 24 in position during some machining operation or work operation on the workpiece 24.

Each holddown jaw includes a base section 34 which is stationarily supported in relation to either the stationary jaw 26 or the movable jaw 28 in any suitable manner such as by bolts, pins or the like depending upon the existing vise structure with the base section 34 being attached to the vise jaws in the same manner as the usual pads provided on the vise jaws.

Disposed between the workpiece 24 and the precision surface 32 on the vise bed is a pair of parallels 36 which have precision surfaces engaging the precision surface 32 and precision surfaces engaging the undersurface of the workpiece 24 and also engaging the inner surface of the vise jaw base section 34. The parallels 36 are retained against the inner surface of the base section 34 by spring clips 38 which are placed on an angle to retain the parallels 36 firmly down against the vise bed to preclude the possibility of chips getting between the bottom of the parallels 36 and the vise bed surface 32. Parallels of various height and width can be readily used as the job requires. Also, the base section 34 has a single pawl 40 received in the uppermost of a downwardly and inwardly inclined groove 42 with the pawl 40 being retained in position by a spring-biased ball detent 44. The pawl 40 engages the side surfaces of the workpiece 24 for biasing the workpiece 24 downwardly against the upper surface of the parallels 36 when the jaws 26 and 28 are moved toward each other.

Figure 2:
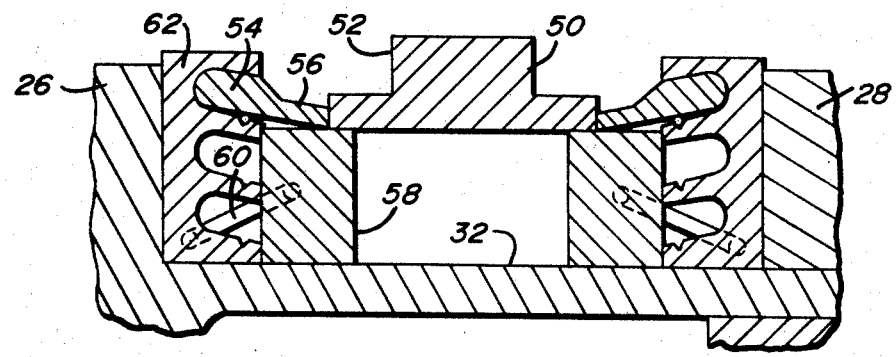
FIG. 2 is a sectional view similar to FIG. 1 but illustrating another type of hold-own pawl associated with a different type of workpiece.

FIG. 2 illustrates a structure quite similar to FIG. 1 but in this construction, a workpiece 50 is gripped which has recesses or the like 52 in the corners thereof thus requiring a holddown pawl 54 having a recess 56 formed in the upper surface thereof where it engages the workpiece 50 thereby eliminating any possible interference with the tool operating on the workpiece when the recesses 52 are being formed. In this construction, parallels 58 are employed in the same manner as the parallels 36 and spring clips 60 are provided for securing the parallels in position against the jaws 26 and 28 or the jaw sections 62 attached to the jaws 26 and 28.

Figure 3:
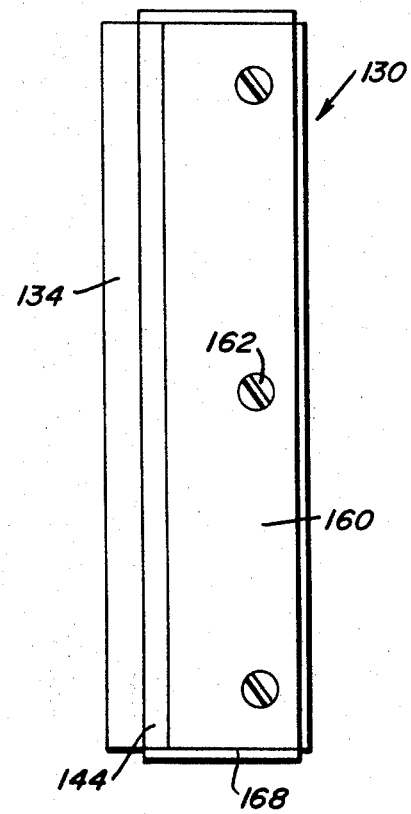
FIG. 3 is a plan view of one of the roller bearing type workpiece holddown jaws.
Figure 4:
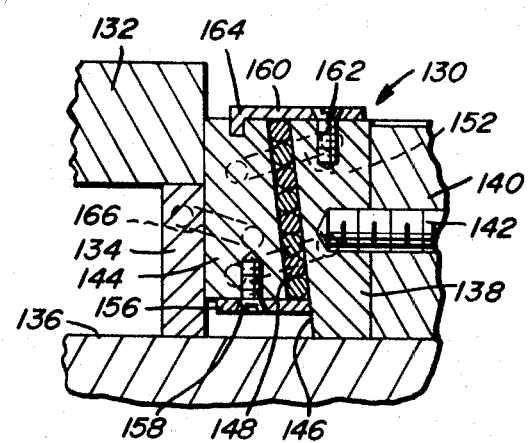
FIG. 4 is a sectional view, on an enlarged scale, of the hold-down jaw construction of FIG. 3 illustrating the roller bearings disposed between inclined surfaces.
Figure 5:
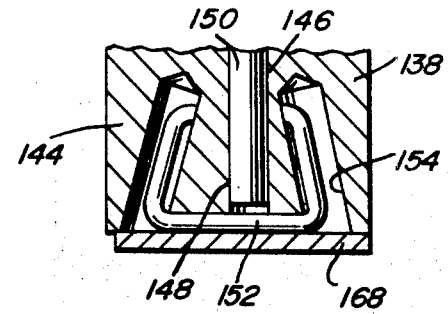
FIG. 5 is a detailed sectional view, on an enlarged scale, illustrating the manner in which the spring clips are associated with the components of the jaws and the roller bearings disposed between the inclined surfaces of the jaw.

FIGS. 3–5 illustrate a roller bearing type of holddown jaw generally designated by numeral 130 for holding a workpiece 132 against a parallel or pair of parallels 134 which rest against the vise bed 136. A stationary base section of the holddown jaw 130 is designated by numeral 138 and is secured to the jaw 140 of a conventional vise by a conventional cap screw 142 or the like.

The movable or gripping section of the holddown jaw 130 is designated by numeral 144. The inner surface of the stationary section 138 of the movable jaw 130 is provided with an upwardly and inwardly inclined surface 146 which is in parallel but spaced relation to an inclined surface 148 on the movable section 144 of the holddown jaw 130. Disposed between the inclined surfaces 146 and 148 is a plurality of roller bearings 150. The movable section 144 is retained in position in relation to the stationary section 138 by a pair of spring clips 152 received in inwardly converging bores 154 as illustrated in FIG. 5 with the position of the roller bearings 150 also being illustrated therein. A lower retaining plate 156 is attached to the movable section 144 by a screw-threaded fastener 158 for engaging the lowermost roller bearing 150 and retaining it in position. A top retainer plate 160 is attached to the stationary base section 138 by a fastener 162. The edge of the upper retaining plate 160 which extends inwardly in overlying relation to the upper end of the movable section 144 is provided with a downturned edge portion 164 which is received in a corresponding groove in the movable section 144 to enable downward movement of the movable section 144 during a clamping operation. Also, the parallel 134 is connected with the movable section 144 and angled in such a way that the parallel is urged against the vise bed 136 by clip springs 166.

The roller bearing type of holddown jaw 130 provides a jaw with downward motion when the workpiece 132 is clamped. The jaw faces are always parallel to the workpiece being held with the face extending from the top of the fixed jaw section to within approximately three-sixteenth inch of the bottom surface of the fixed jaw section 138 which allows for downward motion of the movable jaw section 144. The roller bearings 150 facilitate and assure downward motion bringing the workpiece 132 onto parallel 134 or vise bed 136 thus automatically compensating for any upward movement of the movable jaw of the vise due to imprecision or wear. Another advantage of the roller bearing holddown jaw 130 is that the workpiece 132 can be held in the extreme top portion of the vise without the possibility of the holddown jaws tipping inward at the bottom with resulting action of releasing the workpiece. The top plate 160 actually serves as a dust cap which has a depending edge to prevent chips or foreign matter from getting into the rollers and thus also acts as a stop and retainer for the roller and a limit for the upper position of the movable section 144 in relation to the stationary section 138. The retaining plate 156 on the movable jaw section 144 not only serves as a retainer for the roller but also serves as a chip shield. Thus, as pressure is applied to the workpiece when the vise is clamped, the movable section 144 of the holddown jaw 130 is free to move downwardly against the work while the fixed section of the movable holddown jaw is free to move in an upward direction automatically compensating for the amount of looseness in the sliding jaw of the vise structure.

Side cover plates such as at 168 may be attached to each end of the fixed section of the holddown jaws 130 with screws or the like for maintaining the rollers and the movable sections in place and sealing the ends against chips or foreign matter. End plates are placed in position against the underside of the top plate with the movable section 144 in an extreme top position with the overhanging edge of the top plate serving to seal against entry of chips.

The roller bearing type of holddown jaws are relatively inexpensive to manufacture, and can be used in pairs of singly and will assure effective workpiece clamping without hammering the workpiece downwardly and are self-contained and will remain accurate for an extended period of time. All types of workpieces can be held fully in the device or gripped by the extreme upper portions of the jaw without marring the work. If desired, auxiliary jaws may be attached to the surface of the holddown jaw 130 providing step jaws of desired height firmly attached to the holddown jaws thus assuring true accuracy and eliminating bothersome loose parallels or blocks commonly used that do not stay in place and allow chips to get between the bottom surface and the vise bed. In this construction, the parallels travel with the movable jaw and are always in place and are firmly held against the vise bed eliminating the possibility of chip problems and are readily changed to provide desired height by simply removing the spring clips which retain the parallels in place and then inserting parallels of a desired height and snapping the retaining clips back in place.

The dimensional characteristics and the strength characteristics of the clip spring may be varied depending upon the function which they perform and the components which they interconnect. For example, two spring clips of relatively high strength are employed to hold the jaw assemblies whereas only one spring of less strength may be employed to hold a parallel in place. The springs for holding the jaw sections are placed at an angle whereby the movable section of the holddown jaw is always in extreme upward position whereas the spring for the parallel holds the parallel firmly against the workpiece of the movable holddown section which serves not only to exert an upward pull against the movable section of the holddown jaw but also to urge the parallel firmly down against the vise bed thereby preventing clips from getting under and between the bottom of the parallel and the vise bed. Parallels of various heights, shapes and configurations may be employed depending upon the workpiece involved and the work operation to be performed.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A workpiece holding device for exerting a holddown force thereon comprising a jaw assembly including a base section and a movable section for engaging the workpiece, said sections having spaced inclined surfaces disposed in adjacent spaced relation to each other, said inclined surfaces extending continuously from edge to edge of said sections, anti-friction means disposed between the inclined surfaces whereby clamping force exerted by the movable section on a workpiece will introduce a holddown force perpendicular to the clamping force thereby exerting such holddown force on the workpiece.

2. The structure as defined in claim 1 together with a parallel mounted from the movable section and forming a precision surface for engagement with the workpiece and forming a support surface therefor whereby the hold-down force exerted on the workpiece will retain the workpiece against precision surface.

3. The structure as defined in claim 1 wherein said anti-friction means includes a plurality of roller bearings in rolling contact with the inclined surfaces.

4. The structure as defined in claim 3 together with clip springs retaining the base section and movable section of the jaw assembly in assembled relation with the clip springs being oriented in an upward and outward angular direction to normally bias the movable section of the jaw assembly upwardly.

5. The structure as defined in claim 4 wherein a closure plate bridges the juncture between the movable section and base section of the jaw assembly around the periphery thereof for preventing entry of chips and other foreign material and retaining the roller bearings assembled in the jaw assembly.

6. The structure as defined in claim 2 together with clip spring means holding the parallel to the movable section with the clip spring being disposed in a downward angular direction to retain the parallel downwardly against a supporting surface of a work holding device having a precision surface thereby preventing entry of chips and foreign material between the parallel and the precision surface.

7. A workpiece holding device comprising a bed having a precision surface, a pair of opposed jaws mounted on said bed with at least one of said jaws being movable for gripping and releasing a workpiece, at least one parallel disposed on the precision surface of the bed and engaging the undersurface of the workpiece for forming a support therefor, and means connecting the parallel with a jaw of the work holding device for retaining the parallel against the precision surface of the bed.

8. The structure as defined in claim 7 wherein said means includes spring clips oriented outwardly and downwardly for exerting a downward force on the parallel, said spring clips being generally U-shaped with converging legs, and converging bores receiving said legs for removably retaining the parallel in position against said bed.

9. The structure as defined in claim 8 wherein said jaws each include means for engagement with a workpiece to exert a downward force thereon when an inward gripping force is imparted to the jaws for holding the workpiece against the parallel.

10. The structure as defined in claim 9 wherein said means to exert a downward force includes downwardly and inwardly inclined pawl means on said jaws and including means for grippingly engaging a workpiece and exerting a downward force on the workpiece when the jaws exert an inward clamping force.

11. The structure as defined in claim 9 wherein said means to exert a downward force includes anti-friction rollers disposed between spaced upwardly and inwardly inclined surfaces on relatively movable sections of each jaw for exerting a downward force on the workpiece when the jaws exert an inward clamping force.

* * * * *